(12) United States Patent
Umeda et al.

(10) Patent No.: US 8,891,688 B2
(45) Date of Patent: Nov. 18, 2014

(54) RECEIVER CIRCUIT AND RECEIVER APPARATUS

(75) Inventors: Naoki Umeda, Osaka (JP); Mituru Maeda, Osaka (JP)

(73) Assignee: Panasonic Corporation, Osaka (JP)

(*) Notice: Subject to any disclaimer, the term of this patent is extended or adjusted under 35 U.S.C. 154(b) by 81 days.

(21) Appl. No.: 13/578,719

(22) PCT Filed: Jul. 21, 2010

(86) PCT No.: PCT/JP2010/004665
§ 371 (c)(1),
(2), (4) Date: Aug. 13, 2012

(87) PCT Pub. No.: WO2011/101925
PCT Pub. Date: Aug. 25, 2011

(65) Prior Publication Data
US 2012/0307943 A1    Dec. 6, 2012

(30) Foreign Application Priority Data

Feb. 16, 2010   (JP) ................. 2010-031258

(51) Int. Cl.
*H04L 27/22*  (2006.01)
*H04B 3/54*   (2006.01)
*H04L 7/04*   (2006.01)
*H04L 27/233* (2006.01)

(52) U.S. Cl.
CPC ............. *H04L 27/2331* (2013.01); *H04B 3/54* (2013.01); *H04L 7/042* (2013.01); *H04B 3/548* (2013.01); *H04B 3/542* (2013.01)

USPC ........................................... 375/330

(58) Field of Classification Search
CPC ............................ H04L 7/042; H04I 27/227
USPC ......... 375/303, 320, 322, 324, 326, 330, 340, 375/343, 344, 355, 362
See application file for complete search history.

(56) References Cited

U.S. PATENT DOCUMENTS 5,440,267 A   8/1995   Tsuda et al.
5,661,757 A   8/1997   Takahashi et al.
(Continued)

FOREIGN PATENT DOCUMENTS

CN    1156363     8/1997
CN    1551585 A   12/2004
(Continued)

OTHER PUBLICATIONS

International Search Report for corresponding International Application No. PCT/JP2010/004665 mailed Oct. 5, 2010.

(Continued)

*Primary Examiner* — Sam K Ahn
*Assistant Examiner* — Syed Haider
(74) *Attorney, Agent, or Firm* — Renner, Otto, Boisselle & Sklar, LLP.

(57) ABSTRACT

A no signal period detecting unit (10) detects a no signal period in which no receiver signal is received. A capture unit (7) captures a synchronous timing of the receiver signal on the basis of a correlation value which is worked out by a delayed correlation computing unit (6). Further, the capture unit (7) cancels the capture of the synchronous timing in the case where this no signal period is detected by the no signal period detecting unit (10).

10 Claims, 6 Drawing Sheets

(56) References Cited

U.S. PATENT DOCUMENTS

| | | |
|---|---|---|
| 5,726,641 A | 3/1998 | Ide |
| 5,727,035 A | 3/1998 | Hiramatsu |
| 7,787,579 B2 | 8/2010 | Toda et al. |
| 2007/0211835 A1* | 9/2007 | Inagawa et al. ............... 375/343 |
| 2008/0025452 A1* | 1/2008 | Toda et al. .................... 375/364 |
| 2009/0185645 A1* | 7/2009 | Watanabe ..................... 375/343 |
| 2010/0034297 A1* | 2/2010 | Takasu ........................... 375/257 |
| 2010/0091911 A1* | 4/2010 | Sawai et al. ................... 375/340 |

FOREIGN PATENT DOCUMENTS

| | | |
|---|---|---|
| EP | 1475935 A2 | 5/2004 |
| JP | 61-239740 A | 10/1986 |
| JP | 03-117142 A | 5/1991 |
| JP | 05-183593 A | 7/1993 |
| JP | 05-276152 A | 10/1993 |
| JP | 06-232930 A | 8/1994 |
| JP | 06-261030 A | 9/1994 |
| JP | 07-087149 A | 3/1995 |
| JP | 07-264091 A | 10/1995 |
| JP | 07-273823 A | 10/1995 |
| JP | 08-009435 A | 1/1996 |
| JP | 2002-094584 A | 3/2002 |
| JP | 2003-218969 A | 7/2003 |
| JP | 2008-035233 A | 2/2008 |

OTHER PUBLICATIONS

Chinese Search Report with Translation, corresponding to Chinese Application No. 201080063944.3, issued Apr. 1, 2014.

Chinese Office Action, corresponding to Chinese Application No. 201080063944.3, issued Apr. 1, 2014.

* cited by examiner

RECEIVER CIRCUIT AND RECEIVER APPARATUS

TECHNICAL FIELD

The present invention relates to a receiver circuit which receives a receiver signal of a differential binary phase shift keying, and a receiver apparatus which is provided with the receiver circuit.

BACKGROUND ART

In recent years, there has been known a receiver apparatus which uses a digital modulation system such as a binary phase shift keying (BPSK) or the like. As a delayed detection circuit used in the receiver apparatus in which the digital modulation system as mentioned above is employed, for example, Patent Document 1 has been known. The delayed detection circuit shown in Patent Document 1, a low electric power consumption is achieved by substituting a shift register which is actuated at about 7.288 MHz with a sample hold circuit which is actuated at a symbol clock about 10 kHz.

In this case, in the receiver apparatus using the digital modulation system, there are included a physical layer circuit which carries out a process of a physical layer, and a media access control (MAC) circuit which carried out a MAC layer. The physical layer circuit detects a synchronous timing of the receiver signal and decodes the receiver signal in accordance with the detected synchronous timing so as to output a symbol string of 1, 0 to the MAC circuit. The MAC circuit makes the physical layer circuit cancel a capture of the synchronous timing if it detects a parity error from the symbol string which is output from the physical layer circuit or detects an end timing of the receiver signal.

However, the physical layer circuit starts a process for continuously capturing the synchronous timing if it cancels the capture of the synchronous timing. Accordingly, there is a possibility that the physical layer circuit captures the synchronous timing from a second half portion of the receiver signal in process of receiving if the cancellation of the capture of the synchronous timing is instructed from the MAC circuit in process of receiving one receiver signal. In this case, the physical layer circuit continuously carries out the decoding process in accordance with the synchronous timing unless the cancellation of the capture of the synchronous timing is instructed from the MAC circuit. As a result, the physical layer circuit cannot recognize the end of the receiver signal, and continuously carries out the decoding process in accordance with the captured synchronous timing during a no signal period until the next receiver signal comes, and it is impossible to accurately decode the next receiver signal. Further, Patent Document 1 does not devise any countermeasure while taking into consideration a problem that the decoding process is carried over during the no signal period.

Patent Document 1: Japanese Patent Application Laid-Open No. H5-183593

SUMMARY OF THE INVENTION

An object of the present invention is to provide a receiver circuit and a receiver apparatus which can prevent a decoding process from being carried over in a no signal period.

A receiver circuit in accordance with one aspect of the present invention is a receiver circuit receiving a receiver signal of a differential binary phase shift keying, comprising a delayed correlation computing unit which carries out a delayed correlation computation determining a correlation value correlated to a sampling value before one symbol period, with regard to each of sampling values of the receiver signal, a capture unit which captures a synchronous timing of the receiver signal, on the basis of the correlation value calculated by the delayed correlation computing unit, and a no signal period detecting unit which detects a no signal period which does not receive the receiver signal, wherein the capture unit cancels the capture of the synchronous timing in the case where the no signal period is detected by the no signal period detecting unit.

Further, a receiver apparatus in accordance with another aspect of the present invention is provided with a coupling unit which picks up the receiver signal from a transmission line, a receiver unit which decodes the receiver signal on the basis of the receiver signal picked up by the coupling unit, and an incoming unit which creates a drive power driving the receiver unit from an electric power flowing in the transmission line, wherein the receiver unit is provided with the receiver circuit mentioned above.

MODE FOR CARRYING OUT THE INVENTION

A description will be given below of an embodiment in accordance with the present invention with reference to the accompanying drawings. In this case, a structure to which the same reference numeral is attached in each of the drawings denotes the same structure, and a description thereof will be omitted accordingly. In the following description, a description will be given by exemplifying the case that a receiver circuit and a receiver apparatus in accordance with an embodiment of the present invention are applied to a communication apparatus.

Figure 1:
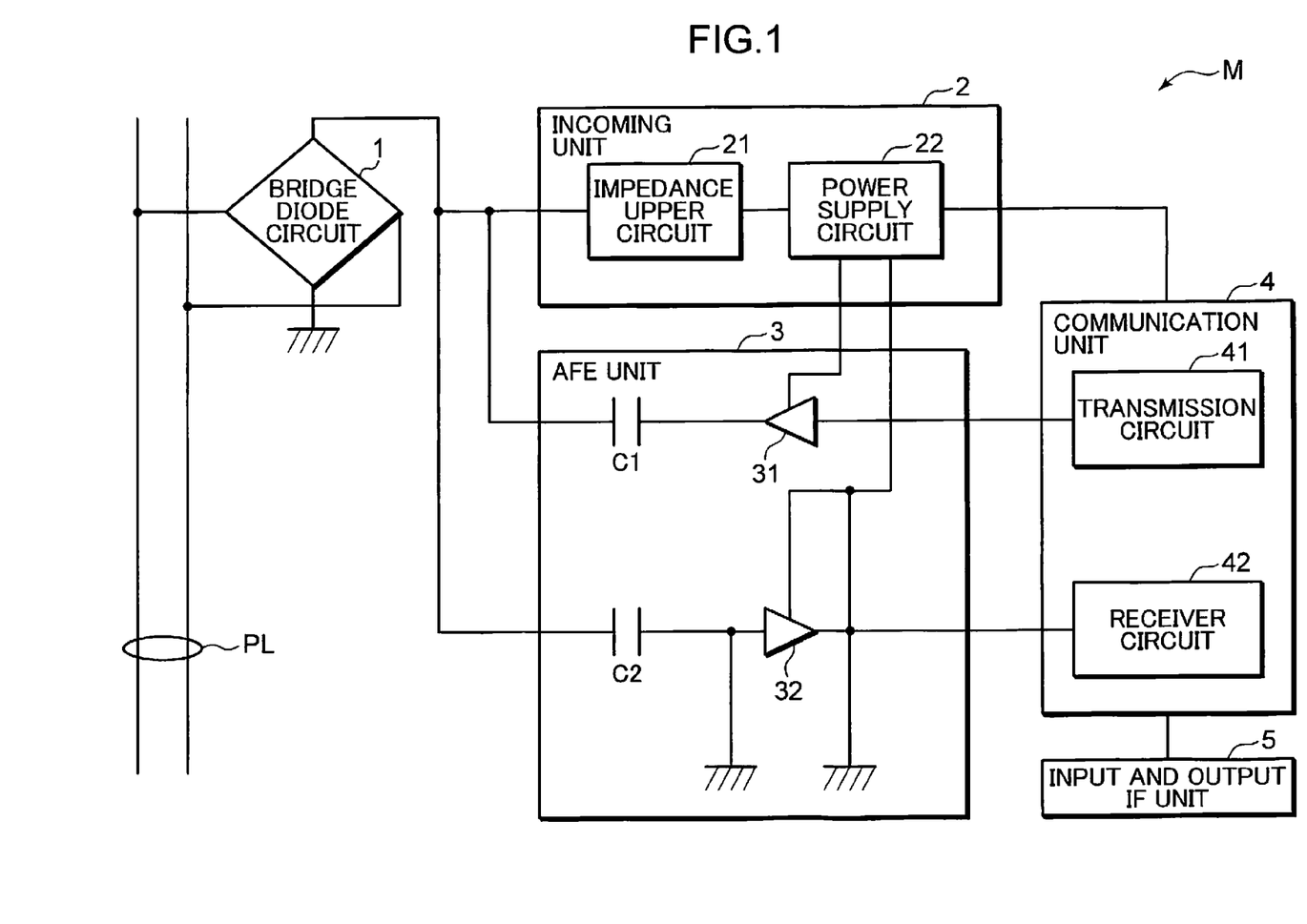
FIG. 1 is a view showing a structure of a communication apparatus to which a receiver apparatus in accordance with an embodiment of the present invention is applied.

FIG. 1 is a view showing a structure of the communication apparatus in accordance with the embodiment of the present invention. The communication apparatus M in accordance with the present embodiment is provided with a function serving as a receiver apparatus which receives a communication signal transmitted from the other communication apparatus (not illustrated) connected via a network, and a function serving as a transmission apparatus which transmits the communication signal to the other communication apparatus or further the other communication apparatus (not illustrated) via a network. As the communication signal, for example, a differential binary phase shift keying (DBPSK) is employed, the data to be transmitted is coded (modified) by the DBPSK, and a transmission wave is created.

In this case, in the DBPSK, in the case where the value of the data to be transmitted is "0", a phase change amount between two mutually adjacent symbols is set to "0" (or "π"), and in the case where the value of the data to be transmitted is "1", the phase change amount is set to "π" (or "0").

As shown in FIG. 1, the communication apparatus M is connected to a transmission line PL by a bridge diode circuit 1, and is provided with an incoming unit 2, an analog front end unit (an AFE unit) 3, a communication unit 4, and an input and output interface unit (an input and output IF unit) 5.

The transmission line PL is a medium for propagating (transmitting) the communication signal, and is connected to the network, or constructs a part of the network. As the transmission line PL, for example, a pair of twisted pair lines can be employed.

Further, in the present embodiment, the communication apparatus M is connected to a pair of twisted pair lines via the bridge diode circuit 1. In accordance with this, a wiring polarity at a time of connecting the communication apparatus M to the twisted pair lines comes to a non-polar with respect to the twisted pair lines, and the communication apparatus M is connected to the twisted pair lines without taking the polarity of the twisted pair lines into consideration. In other words, one end and another end in a pair of input ends of the bridge diode circuit 1 may be connected to a voltage line and a ground line of the twisted pair lines, or may be connected to the ground line and the voltage line of the twisted pair lines.

The incoming unit 2 is connected to the bridge diode circuit 1, and creates a drive power driving the present communication apparatus M from an electric power which flows in the transmission line PL via the bridge diode circuit 1.

Further, the incoming unit 2 is provided with an impedance upper circuit 21 which comes to a high impedance with respect to a communication zone of the communication signal which is propagated in the transmission line PL, and a power supply circuit 22 which creates a DC power from an AC power. In this case, the high impedance with respect to the communication zone means that an influence applied to a transmission distance of the communication signal which is propagated in the transmission line PL is small. The impedance upper circuit 21 is structured, for example, such that it is provided with an inductor which comes to a high impedance with respect to the communication zone of the communication signal which is propagated in the transmission line PL. The power supply circuit 22 is structured, for example, such that it is provided with a three terminal regulator and a capacitor, and creates a drive power having a predetermined constant voltage from the AC power.

The electric power flowing in the transmission line PL is fed to the incoming circuit 2 via the bridge diode circuit 1. The incoming unit 2 converts the electric power fed via the impedance upper circuit 21 into the drive power having the predetermined constant voltage by the power supply circuit 22, and feeds the converted constant voltage to each of the blocks such as the AFE unit 3, the communication unit 4 and the like.

The AFE unit 3 is connected to the bridge diode circuit 1, and couples the transmission line PL and the communication unit 4 to each other via the bridge diode circuit 1. Further, the AFE unit 3 picks up the communication signal flowing in the transmission line PL as the receiver signal so as to output to the communication unit 4 via the bridge diode circuit 1. Further, the AFE unit 3 outputs the communication signal output from the communication unit 4 as a transmission signal to the transmission line PL via the bridge diode circuit 1.

Further, the AFE unit 3 is provided with capacitors C1 and C2, an amplifier 31 and a limiter amplifier 32. The capacitors C1 and C2 cut (shut off) a frequency of a power component flowing in the transmission line PL, that is, a frequency of a power component except at least a power component by the communication signal.

The capacitor C1 is connected between the amplifier 31 and the bridge diode circuit 1. The capacitor C2 is connected between the bridge diode circuit 1 and the limiter amplifier 32.

The amplifier 31 is driven by the drive power which is fed from the incoming unit 2, and amplifies the transmission signal output from the communication unit 4 in accordance with a predetermined amplification factor.

The limiter amplifier 32 is constructed, for example, by a hysteresis comparator, and converts the receiver signal which is input via the bridge diode circuit 1 and the capacitor C2 into a rectangular wave signal having an approximately rectangular shape so as to amplify. Specifically, the limiter amplifier 32 outputs a predetermined voltage value of a high level if a level of the receiver signal becomes equal to or more than an upper threshold value, and outputs a predetermined voltage value of a low level if the level of the receiver signal becomes equal to or lower than a lower threshold value. The limiter amplifier 32 is driven by the drive power being fed to the limiter amplifier 32 from the incoming unit 2.

The communication signal which is propagated in the transmission line PL is received as the receiver signal via the bridge diode circuit 1. Further, the receiver signal is input to the limiter amplifier 32 via the capacitor C2 of the AFE unit 3, and is converted into the rectangular wave signal in correspondence to an amplification level so as to be amplified. The amplified rectangular wave signal is input to the communication unit 4 via the limiter amplifier 32 of the AFE unit 3. Further, the transmission signal created by the communication unit 4 is input to the amplifier 31, is amplified by a predetermined amplification factor, and is delivered to the transmission line PL via the capacitor C1 and the bridge diode circuit 1.

In this case, as the limiter amplifier 32, for example, there can be employed an active filter which is combined with a function of a band path filter (BPF) which extracts only a communication zone (a transmission zone) used for the communication. In accordance with this, it is possible to remove a frequency component except the communication zone as a noise signal from the communication signal.

The communication unit 4 is connected to each of the incoming unit 2 and the AFE unit 3, decodes (demodulates) the data of the communication signal on the basis of the rectangular wave signal which is output from the AFE unit 3, and codes (modulates) the data to be transmitted into the communication signal. Further, the communication unit 4 is provided with a transmission circuit 41 which codes (modulates) the data to be transmitted into the communication signal, and a receiver circuit 42 which decodes (demodulates) the data of the receiver signal. Details of the receiver circuit 42 will be mentioned later.

The input and output IF unit 5 is connected to the communication unit 4, and is an interface circuit for inputting and outputting the data between the present communication apparatus M and an external equipment. In the case where the external equipment is connected to the input and output IF unit 5, the data input to the input and output IF unit 5 from the external equipment is output to the transmission circuit 41 of the communication unit 4, and is coded (modulated) by the transmission circuit 41 of the communication unit 4. On the other hand, the data decoded (demodulated) by the receiver circuit 42 of the communication unit 4 is output to the input and output IF unit 5, and is output to the external equipment.

Figure 2:
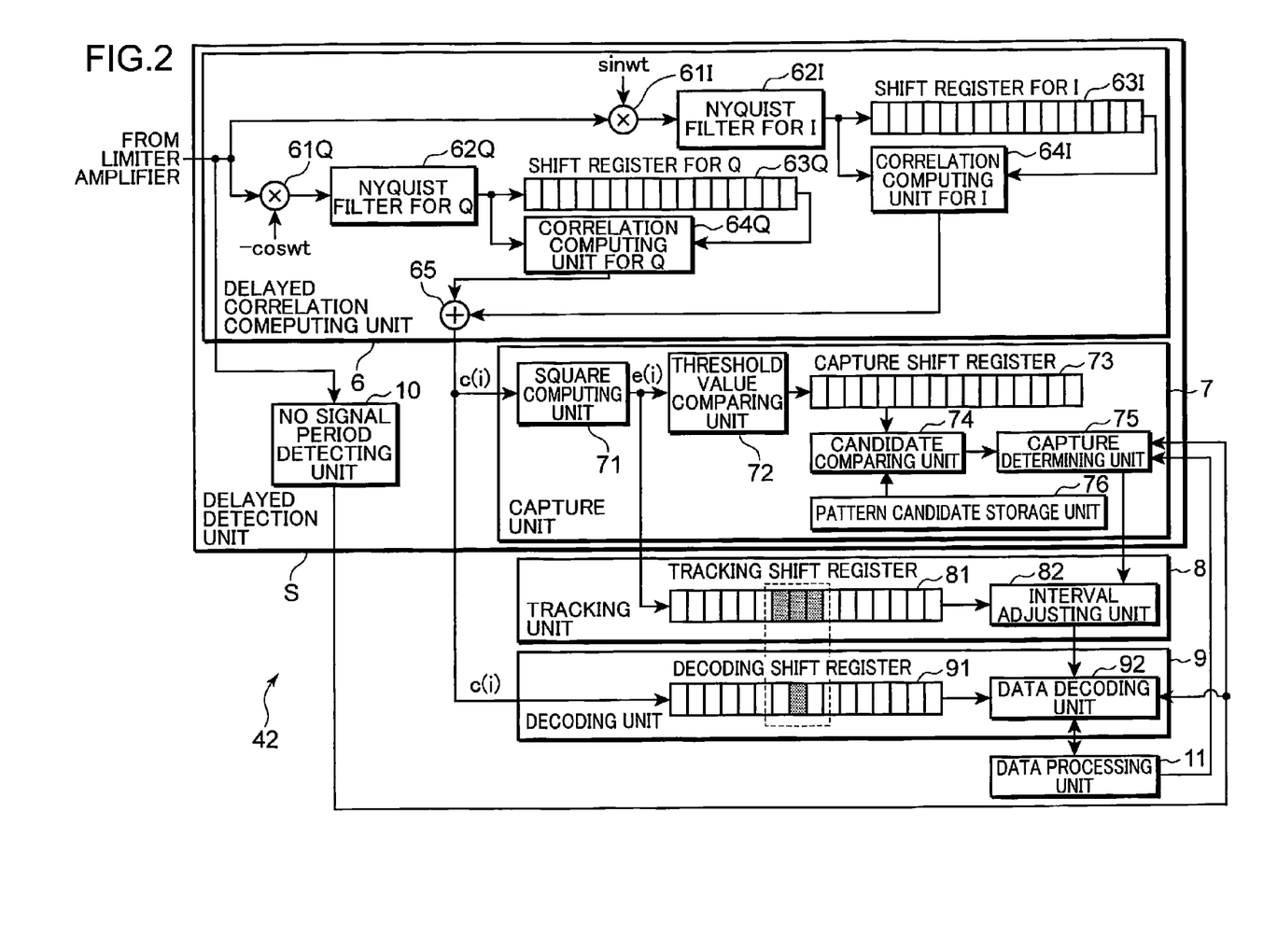
FIG. 2 is a circuit diagram showing a detailed structure of a receiver circuit shown in FIG. 1.

FIG. 2 is a circuit diagram showing a detailed structure of the receiver circuit 42 shown in FIG. 1. The receiver circuit 42 is provided with a delayed detection circuit S, a tracking unit 8, a decoding unit 9, and a data processing unit 11, as shown in FIG. 2. The delayed detection circuit S is provided with a delayed correlation computing unit 6, a capture unit 7, and a no signal period detecting unit 10.

The delayed correlation computing unit 6 is connected to an output end of a limiter amplifier 32 shown in FIG. 1, and carried out a delayed correlation computation which determines a correlation value with a sampling value before one symbol period, with respect to each of the sampling values of the receiver signal by using a rectangular wave signal output from the limiter amplifier 32.

The no signal period detecting unit 10 detects a no signal period which does not receive the receiver signal. The no signal period detecting unit 10 detects a generation of the no signal period in the case where a signal of a low level is output from the limiter amplifier 32 continuously for a predetermined time or longer.

Alternatively, the no signal period detecting unit 10 monitors a frequency of the receiver signal, and detects the generation of the no signal period in the case of monitoring continuously for a predetermined time the receiver signal in which the frequency deflects greatly from a carrier frequency or a transmission zone.

In this case, as the predetermined time, for example, there may be employed a value which is previously determined on the basis of an interval between the receiver signals in the case where a plurality of receiver signals are continuously transmitted from the certain communication apparatus.

The capture unit 7 captures a synchronous timing of the receiver signal on the basis of a correlation value which is calculated by the delayed correlation computing unit 6. Further, the capture unit 7 cancels the captured synchronous timing in the case where the no signal period is detected by the no signal period detecting unit 10. Further, the capture unit 7 informs the tracking unit 8 and the decoding unit 9 of the fact if it captures the synchronous timing. Further, if the capture unit 7 cancels the capture of the synchronous timing, it informs the tracking unit 8 and the decoding unit 9 of the fact.

The delayed correlation computing unit 6 is connected to the limiter amplifier 32 shown in FIG. 1, and is provided with a multiplier for I (a mixer for I) 61I, a Nyquist filter for I 62I, a shift register for I 63I, a correlation computing unit for I 64I, a multiplier for Q (a mixer for Q) 61Q, a Nyquist filter for Q 62Q, a shift register for Q 63Q, a correlation computing unit for Q 64Q, and an adder 65.

The output of the limiter amplifier 32 of the AFE unit 3 is sampled at a predetermined sampling interval so as to be input to the receiver circuit 42, and is input to the delayed correlation computing unit 6. The sampling interval is decided in accordance with a so-called sampling theorem, however, is set in the present embodiment such that one symbol is sampled at previously set predetermined number n of sampling points.

The multiplier for I 61I is connected to the limiter amplifier 32 shown in FIG. 1, and extracts an I signal component from the receiver signal by multiplying the output of the limiter amplifier 32 and sin ωt of a local frequency ω. The Nyquist filter for I 62I is connected to the multiplier for I 61I, and filters the I signal component output from the multiplier for I 61I in accordance with a predetermined Nyquist filter characteristic. The Nyquist filter for receiving is structured such as to have a Nyquist filter characteristic on the basis of a set (combination) with a Nyquist filter for transmitting.

The shift register for I 63I is connected to the Nyquist filter for I 62I, and stores the output of the Nyquist filter for I 62I by a predetermined bit number. In the present embodiment, since a waveform of one symbol is sampled at the n number of sampling points, the shift register for I 63I is constructed by n bits in such a manner as to store the data for one symbol.

The shift register is a digital circuit in which a plurality of flip flops storing the data (the values) for one bit are cascade connected, and is a circuit in which the data for one bit sequentially moves (shifts) within the circuit.

The correlation computing unit for I 64I is connected to the Nyquist filter for I 62I and the shift register for I 63I, and multiplies the output of the Nyquist filter for I 62I and the output of the shift register for I 63I. In accordance with this, each of the sampling values of the I signal component is multiplied by the sampling value before one symbol, and the delayed correlation computation is carried out.

The multiplier for Q 61Q is connected to the limiter amplifier 32 shown in FIG. 1, and extracts a Q signal component from the receiver signal by multiplying the output of the limiter amplifier 32 and −cos ωt of the local frequency ω.

The Nyquist filter for Q 62Q is connected to the multiplier for Q 61Q, and filters the Q signal component output from the multiplier for Q 61Q in accordance with a predetermined Nyquist filter characteristic. The Nyquist filter for receiving is structured such as to have a Nyquist filter characteristic on the basis of a set (combination) with a Nyquist filter for transmitting.

The shift register for Q 63Q is connected to the Nyquist filter for Q 62Q, and stores the output of the Nyquist filter for Q 62Q by a predetermined bit number. The shift register for Q 63Q is constructed by n bits in such a manner that it can store the data for one symbol.

The correlation computing unit for Q 64Q is connected to the Nyquist filter for Q 62Q and the shift register for Q 63Q, and multiplies the output of the Nyquist filter for Q 62Q and the output of the shift register for Q 63Q. In accordance with this, each of the sampling values of the Q signal component is multiplied by the sampling value before one symbol, and the delayed correlation computation is carried out.

The adder 65 is connected to each of the correlation computing unit for I 64I and the correlation computing unit for Q 64Q, and adds the output of the correlation computing unit for I 64I and the output of the correlation computing unit for Q 64Q so as to set to a correlation value $c(i)$ and output to each of the capture unit 7 and the decoding unit 9. In this case, reference symbol i denotes a clock number of an action clock.

The capture unit 7 is connected to the delayed correlation computing unit 6, and is provided with a square computing unit 71, a threshold value comparing unit 72, a capture shift register 73, a candidate comparing unit 74, a capture determining unit 75, and a pattern candidate storage unit 76.

The square computing unit 71 calculates a square correlation value $e(i)$ by squaring the correlation value $c(i)$ which is output from the adder 65.

The threshold value comparing unit 72 binarizes the square correlation value $e(i)$ by comparing the square correlation value $e(i)$ which is output from the square computing unit 71 with a predetermined first threshold value Th1. The capture shift register 73 stores an output value (a result of comparison of the first threshold value) which is output from the threshold value comparing unit 72 at a predetermined bit number. In this case, the capture shift register 73 is constructed by n bits in such a manner that it can store the data for one symbol.

In accordance with this, a shape data for one symbol on the basis of the output of the delayed correlation computing unit 6 is created, and the shape data for one symbol is stored in the capture shift register 73. In this case, the square computing unit 71, the threshold value comparing unit 72, and the capture shift register 73 correspond to one example of a shape creating unit.

The pattern candidate storage unit 76 is a circuit which previously stores a plurality of candidates of the shape data for one symbol as a pattern candidate. The pattern candidate is a predetermined bit pattern which is formed by previously defining a value of each of the bits, a plurality of pattern candidates are bit patterns which are different from each other, and at least one of a plurality of pattern candidates is structured such that at least one value in each of the bits is optional.

Figure 3:
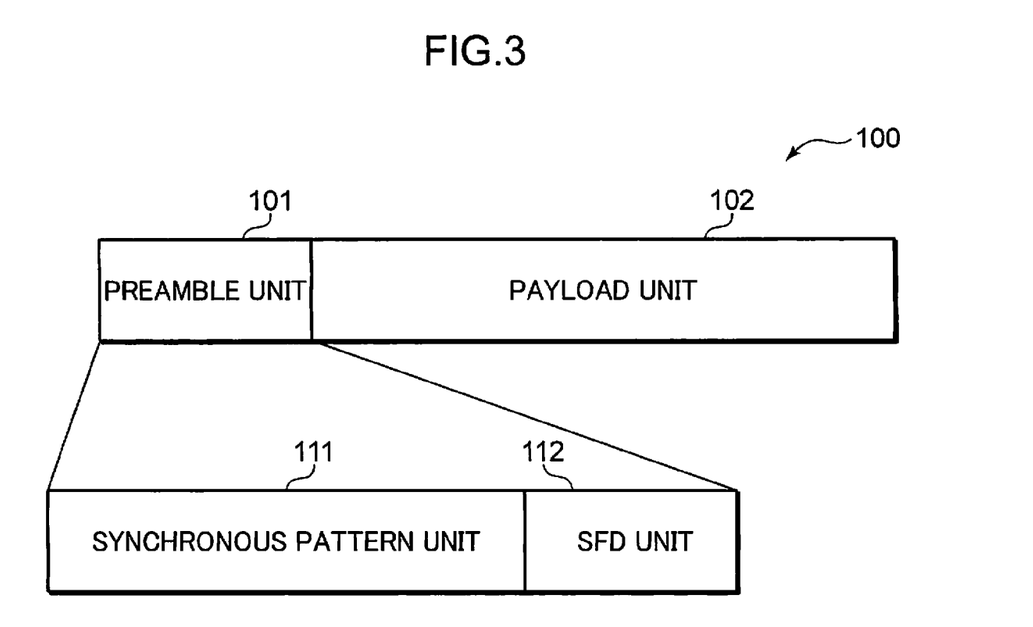
FIG. 3 is a view showing a frame structure of a communication signal which is used in the communication apparatus in the embodiment.

FIG. 3 is a view showing a frame structure of a communication signal which is used in the communication apparatus M in the embodiment. A frame 100 of the receiver signal is provided with a preamble unit 101, and a payload unit 102 which accommodates the data to be transmitted, for example, as shown in FIG. 3. The preamble unit 101 is provided with a synchronous pattern unit 111 which accommodates a synchronous pattern used for capturing a synchronous timing of the receiver signal, and an SFD unit 112 which expresses an end of the synchronous pattern unit 111. The SFD unit 112 is structured such as to express the end of the preamble unit 101, and is further structured such as to express a start of the payload unit 102.

In the present embodiment, for example, "111 . . . 111" is accommodated as the synchronous pattern in the synchronous pattern unit 111, and for example, "1010" is accommodated in the SFD unit 112. In the DBPSK system, a phase change amount between two mutually adjacent symbols is parallelized to the value of the data. In the case of the DBPSK system as mentioned above, since the phase is inverted every time by employing 111 . . . 111, "111 . . . 111" is employed in the synchronous pattern, and even if some noise gets on the receiver signal, the synchronization is secured.

Further, in the case where the shape data of one symbol is created from the receiver signal, and the noise hardly gets on the receiver signal (in the case where the noise is hardly superposed on the receiver signal), there comes to a pattern in which "1" is in the vicinity of the center of the n number of sampling points, and "0" is in the other, for example, "00 . . . 01110 . . . 00" or "00 . . . 00100 . . . 00".

However, for example, if the noise is superposed on the receiver signal or the phase is shifted, there is a case that "1" appears at a position which is not in the vicinity of the center, in the shape data for one symbol. Accordingly, in the present embodiment, the number of the pattern candidates which are previously stored in the pattern candidate storage unit 76 is set to the plural number. Further, in these plurality of pattern candidates, there are included a pattern which includes "1" at a position which is not in the vicinity of the center of the n number of sampling points, a pattern in which the position which is not in the vicinity of the center of the n number of sampling points is not defined (the data value is optional, that is, may be "0" or "1"), and the like.

These plurality of pattern candidates are previously defined, for example, by taking into consideration a topology of the transmission line which the communication apparatus M uses, and a transmission characteristic thereof (for example, a deforming way of the phase or the like), and include two patterns of "00 . . . 01110 . . . 00" and "00 . . . 00100 . . . 00", and further include patterns of "00 . . . 011110 . . . 00", "00 . . . 1XX1111XXX1 . . . 00" and the like. In this case, X denotes "0" and "1".

The candidate comparing unit 74 is connected to each of the capture shift register 73 and the pattern candidate storage unit 76, and compares the shape data for one symbol which is stored in the capture shift register 73 with each of a plurality of pattern candidates which are stored in the pattern candidate storage unit 76. In the comparison between the shape data for one symbol which is stored in the capture shift register 73 with each of a plurality of pattern candidates which are stored in the pattern candidate storage unit 76, the candidate comparing unit 74 compares each of the bit values which are stored in each of the bits of the capture shift register 73, with each of the bit values of the pattern candidates.

The capture determining unit 75 determines that the synchronous timing is captured, in the case where a frequency at which the shape data for one symbol of the capture shift register 73 compared by the candidate comparing unit 74 coincides with at least one of a plurality of pattern candidates continuously comes to a plurality of times, on the basis of the result of comparison which is input by the candidate comparing unit 74. In this case, as a coincidence frequency, for example, various values such as two, three or four times can be employed. If the coincidence frequency is increased, a precision of determination is increased, however, a determining time becomes longer on the contrary.

The tracking unit 8 specifies the square correlation value e(i) corresponding to the current synchronous timing as the center square correlation value of one symbol, and adjusts a time interval before the next synchronous timing comes after the current synchronous timing, on the basis of the specified center square correlation value and square correlation values time-wise in the vicinity of the center square correlation value. In this case, the tracking unit 8 is provided with a tracking shift register 81 and an interval adjusting unit 82.

The tracking shift register 81 is connected to the square computing unit 71, and stores the square correlation value e(i) for one symbol which is sequentially output from the square computing unit 71. In this case, at a timing at which one data is stored in a left end of the capture shift register 73, the data of the same sampling point as the data is input to a left end of the tracking shift register 81.

The interval adjusting unit 82 specifies the bit position which stores the maximum square correlation value, by comparing a mean value which is the square correlation value stored at the center bit position of the tracking shift register 81, an early value which is the square correlation value stored at the bit position in an upstream side of the center bit position, and a late value which is the square correlation value stored at the bit position in a downstream side of the center bit position, each time the synchronous timing comes.

Further, the interval adjusting unit 82 applies a predetermined point to the specified bit position, specifies the bit position at which an accumulated value of the applied points becomes maximum, and adjusts a time interval before the next synchronous timing comes after the current synchronous timing, on the basis of the specified bit position.

Specifically, the interval adjusting unit 82 is provided with a MEAN counter, an EARLY counter and a LATE counter which respectively correspond to the mean value, the early value and the late value. Further, the distance adjusting unit 82 compares the mean value, the early value and the late value per n cycle at which the synchronous timing comes, and adds one point to the counter which corresponds to the maximum value of the result of comparison.

Further, the interval adjusting unit 82 sets the n cycle to the time interval before the next synchronous timing in the case where the MEAN counter comes to a predetermined second threshold value Th2 or more. Further, the interval adjusting unit 82 sets (n+1) cycle to the time interval before the next synchronous timing in the case where the EARLY counter comes to the second threshold value Th2 or more. Further, the interval adjusting unit 82 sets (n−1) cycle to the time interval before the next synchronous timing in the case where the LATE counter comes to the second threshold value Th2 or more.

In this case, as the bit position of the mean value, the bit position in the center of the tracking shift register 81 can be employed in the case where the n which is the bit number of the tracking shift register 81 is an odd number, and the bit position in (n/2)-th or (n/2+1)-th from the bit position in a left end can be employed in the case where the n is an even number.

Further, as the bit position of the early value, the bit position which is in leftward adjacent to the center bit position can be employed. Further, as the bit position of the late value, for example, the bit position which is in rightward adjacent to the center bit position can be employed.

FIG. 4 are timing charts for explaining an action of the tracking unit 8 shown in FIG. 2. FIG. 4A shows an action clock for synchronously actuating each of the circuits which construct the receiver circuit 42. This action clock has, for example, the same frequency as the sampling frequency. FIG. 4B shows a correlation value c(i) which is output from the adder 65, and the correlation value c(i) is shown in correspondence to a concentration. FIG. 4C shows a synchronous timing which the capture determining unit 75 captures.

Figure 4A:
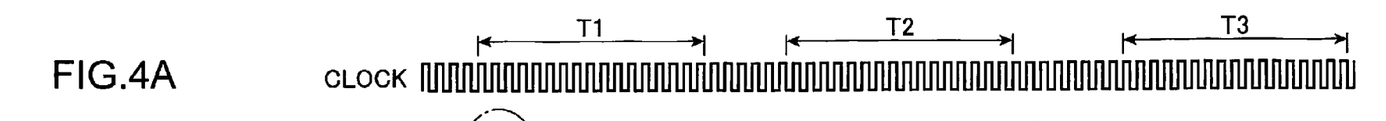
FIG. 4 are timing charts for explaining an action of a tracking unit shown in FIG. 2.
Figure 4B:
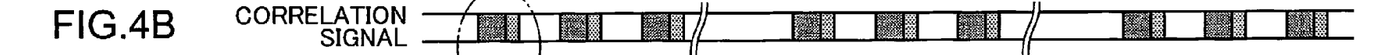
Figure 4C:
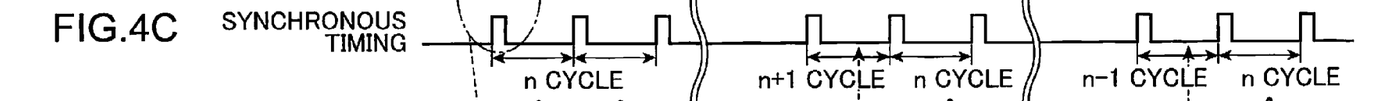
Figure 4D:
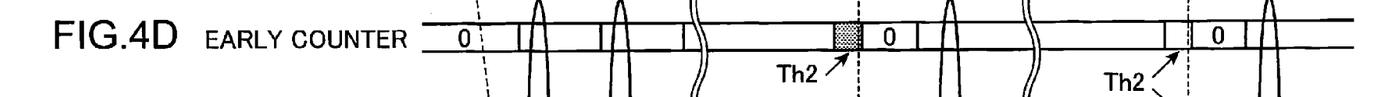
Figure 4E:
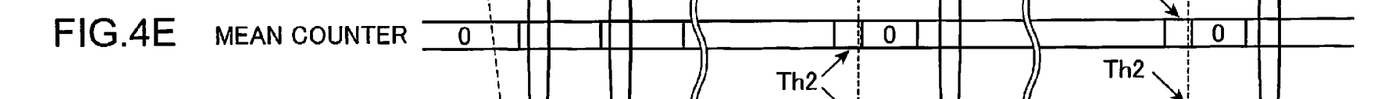
Figure 4F:
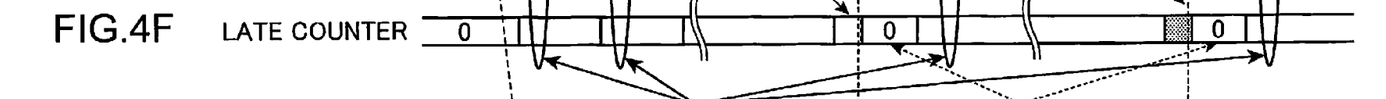
Figure 4G:
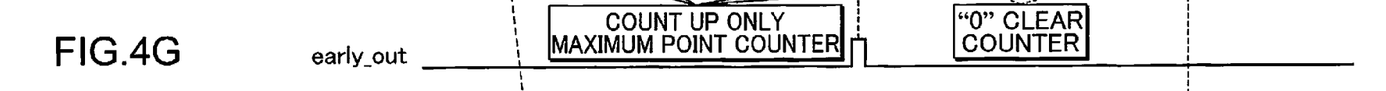
Figure 4H:
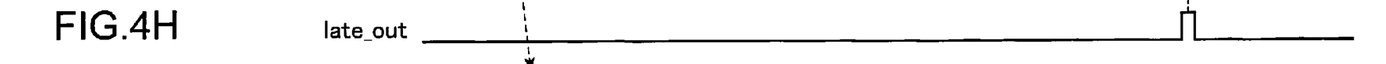
Figure 4I:
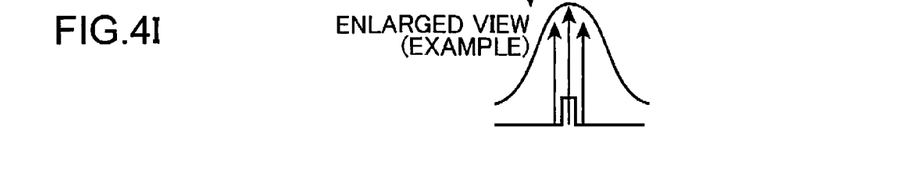

FIG. 4D shows an accumulated value of the EARLY counter, FIG. 4E shows an accumulated value of the MEAN counter, and FIG. 4F shows an accumulated value of the LATE counter. FIG. 4G shows an early_out corresponding to a signal which the interval adjusting unit 82 outputs to a data decoding unit 92 in the case where the accumulated value of the EARLY counter becomes equal to or more than the second threshold value Th2. FIG. 4H shows a late_out corresponding to a signal which the interval adjusting unit 82 outputs to the data decoding unit 92 in the case where the accumulated value of the LATE counter becomes equal to or more than the second threshold value Th2. FIG. 4I is a waveform view showing a waveform of the correlation value c(i) shown in FIG. 4B in an enlarged manner.

In a term T1, in all of the EARLY counter, the MEAN counter and the LATE counter, the accumulated values do not become equal to or more than the second threshold value Th2. In this case, as shown in FIG. 4I, it is presumed that the center of the symbol comes to the synchronous timing. Accordingly, in the time interval of the synchronous timing, the n cycle is maintained.

In a term T2, the accumulated value of the EARLY counter becomes equal to or more than the second threshold value Th2. In this case, a time point one sample point before the center of the symbol comes to the synchronous timing. Accordingly, (n+1) cycle after the first synchronous timing is set to a second synchronous timing. Thereafter, all the accumulated values of the EARLY counter, the MEAN counter and the LATE counter are reset to 0. Therefore, in the term T2, the time interval from the second synchronous timing to the third synchronous timing is returned to the n cycle.

Further, if the accumulated value of the EARLY counter becomes equal to or more than the second threshold value Th2, the interval adjusting unit 82 outputs the early_out to the data decoding unit 92. In accordance with this, the data decoding unit 92 recognizes that the next synchronous timing is (n+1) cycle after the previous synchronous timing.

In a term T3, the accumulated value of the LATE counter becomes equal to or more than the second threshold value Th2. In this case, a time point one sample point after the center of the symbol comes to the synchronous timing. Accordingly, the time interval from the first synchronous timing to the second synchronous timing is set to (n−1) cycle. Thereafter, all the accumulated values of the EARLY counter, the MEAN counter and the LATE counter are reset to 0. Therefore, in the term T3, the time interval from the second synchronous timing to the third synchronous timing is returned to the n cycle.

Further, if the accumulated value of the LATE counter becomes equal to or more than the second threshold value Th2, the interval adjusting unit 82 outputs the late_out to the data decoding unit 92. In accordance with this, the data decoding unit 92 recognizes that the next synchronous timing is (n−1) cycle after the previous synchronous timing.

In this case, since the center of the symbol comes to the synchronous timing in the case where the MEAN counter becomes equal to or more than the second threshold value Th2, the interval adjusting unit 82 maintains the current synchronous timing. In accordance with this, the interval adjusting unit 82 does not output the early_out and the late_out to the data decoding unit 92. In accordance with this, the data decoding unit 92 recognizes that the next synchronous timing is n cycle after the previous synchronous timing.

Turning back to FIG. 2, the decoding unit 9 decodes the receiver signal on the basis of the captured synchronous timing in the case where the synchronous timing of the receiver signal is captured by the capture unit 7. Further, the output of the decode data to the data processing unit 11 is started after detecting the SFD unit 112 of the frame 100 of the receiver signal. In this case, the decoding unit 9 is provided with a decoding shift register 91 and the data decoding unit 92.

The decoding shift register 91 has a storage capacity of n bit, and stores the correlation value c(i) which is output sequentially from the adder 65. The data decoding unit 92 decodes the data of one bit which is included in the receiver signal on the basis of the correlation value which is stored at the bit position in the center of the decoding shift register 91, at the synchronous timing. In this case, at a timing at which one data is stored in a left end of the capture shift register 73, the data of the same sampling point as the data is input to the left end of the decoding shift register 91.

In this case, the data decoding unit 92 decides a code 0 or 1 in accordance with a code converting system of DBPSK from the value of the correlation value c(i) which is stored at the bit position in the center of the decoding shift register 91, at the synchronous timing, and sets the decided code as a decode data corresponding to the synchronous timing.

Figure 5A:
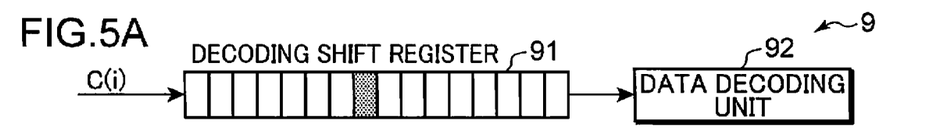
FIG. 5 are views explaining a modified embodiment of a decoding unit shown in FIG. 2.
Figure 5B:
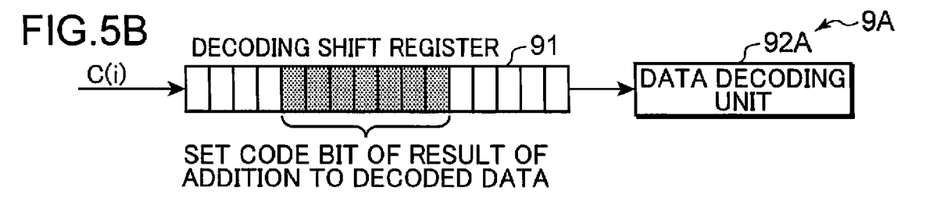

In this case, as the decoding unit 9, a structure shown in FIG. 5B may be employed in place of the structure shown in FIG. 2 (FIG. 5A). FIGS. 5A and 5B are views explaining a modified embodiment of the decoding unit 9 shown in FIG. 2, in which FIG. 5A shows the same decoding unit 9 as FIG. 2, and FIG. 5B shows a decoding unit 9A in the modified embodiment.

As shown in FIG. 5B, the decoding unit 9A is provided with a decoding shift register 91, and a data decoding unit 92A. The decoding shift register 91 is connected to the adder 65, and stores the correlation value c(i) for one symbol. The data decoding unit 92A is connected to a rear end of the decoding shift register 91, and decodes the data for one bit which is included in the receiver signal on the basis of the correlation value which is stored at the bit position in the center of the decoding shift register, the correlation value which is stored at one or a plurality of bit positions in an upstream side of the bit position in the center, and the correlation value which is stored at one or a plurality of bit positions in a downstream side of the bit position in the center, at the synchronous timing.

In this case, as the bit position in the center, a bit position in the center of the decoding shift register 91 can be employed in the case where the n is an odd number, and a bit position in (n/2)-th or (n/2+1)-th from a left end of the decoding shift register 91 can be employed in the case where the n is an even number. Further, as the bit position in the upstream side of the bit position in the center, one or a plurality of bit positions which are leftward adjacent to the bit position in the center can be employed. Further, as the bit position in the downstream side of the bit position in the center, one or a plurality of bit positions which are rightward adjacent to the bit position in the center can be employed.

More specifically, the data decoding unit 92A determines a summation of the correlation value of the bit position in the center of the decoding shift register 91, the correlation value of one or a plurality of bit positions which are leftward adjacent to the bit position in the center, and the correlation value of one or a plurality of bit positions which are rightward adjacent to the bit position in the center. Further, the data decoding unit 92A decides the code 0 or 1 in accordance with the code converting system of DBPSK from the determined summation, and sets the decided code to the decoding data corresponding to the synchronous timing.

In the embodiment in FIG. 5B, three bit positions in the left side of the bit position in the center are employed as the bit position in the upstream side with respect to the bit position in the center, and three bit positions which are rightward adjacent to the bit position in the center are employed as the bit position in the downstream side with respect to the bit position in the center. Accordingly, the data decoding unit 92A determines a summation of the correlation value $c(i)$ which is stored at three bit positions which are leftward adjacent to the bit position in the center, the correlation value $c(i)$ which is stored at the bit position in the center, and the correlation value $c(i)$ which is stored at three bit positions which are rightward adjacent to the bit position in the center, each time the synchronous timing comes, and decodes the receiver signal.

In this case, in the embodiment in FIG. 5B, the summation is determined by using the correlation values of seven bits symmetrically centering on the bit position in the center, however, the summation is not limited to this. For example, the summation may be determined by using the correlation values of five bits symmetrically centering on the bit position in the center, or the summation may be determined by using the correlation values of three bits symmetrically centering on the bit position in the center.

As mentioned above, since the decoding unit 9A of the structure shown in FIG. 5B decodes the data by determining the summation of the correlation values of a plurality of bits symmetrically centering on the bit position in the center of the decoding shift register 91, it is possible to accurately decode the data even if a noise is somewhat mixed into the receiver signal.

Turning back to FIG. 2, the data processing unit 11 detects an end timing of the receiver signal on the basis of the decoding data which is decoded by the decoding unit 9. Further, the data processing unit 11 detects whether or not an error bit is included, on the basis of the decode data which is decoded by the decoding unit 9.

In this case, for example, the data indicating the bit length of the payload unit 102 is included in the payload unit 102 shown in FIG. 3. Accordingly, if an input of the decode data from the data decoding unit 92 is started, the data processing unit 11 starts the decode of the payload unit 102, detects the data indicating the bit length, and specifies the data length of the payload unit 102 from this data.

Further, if the data for the bit length is input from the data decoding unit 92, the data processing unit 11 detects the end of the frame 100 of the receiver signal. Further, if the data processing unit 11 detects the end of the frame 100 of the receiver signal, it instructs the capture determining unit 75 and the data decoding unit 92 in such a manner as to cancel the capture of the synchronous timing. In accordance with this, the capture determining unit 75 cancels the capture of the captured synchronous timing, and again starts the process of capturing the synchronous timing, and the data decoding unit 92 stops the decoding process of the receiver signal.

Further, the data processing unit 11 carries out a parity error check of the receiver signal by using a parity bit which is included in the payload unit 102. Further, if the data processing unit 11 detects the parity error, it instructs the capture determining unit 75 and the data decoding unit 92 in such a manner as to cancel the capture of the synchronous timing. In accordance with this, the capture determining unit 75 cancels the capture of the synchronous timing, and again starts the process of capturing the synchronous timing, and the data decoding unit 92 stops the decoding process of the receiver signal.

Next, a description will be given of an action at a time when the communication apparatus M in accordance with the present embodiment receives the receiver signal. The communication apparatus M in accordance with the present embodiment starts the action, for example, by turning on a power supply switch or the like which is not illustrated.

Further, if the communication apparatus M starts a receiving action of the receiver signal, it incorporates the receiver signal to the AFE unit 3 from the transmission line PL via the bridge diode circuit 1. The incorporated receiver signal is input to the limiter amplifier 32 via the capacitor C2, is converted into a waveform corresponding to an amplitude level of the receiver signal by the limiter amplifier 32, and is output to the receiver circuit 42.

The receiver signal input to the receiver circuit 42 is delayed detected by the delayed detection circuit S. Specifically, first of all, the receiver signal is input to each of the multiplier for I 61I and the multiplier for Q 61Q.

The receiver signal input to the multiplier for I 61I is multiplied by $\sin \omega t$, and an I signal component is extracted, and is input to the Nyquist filter for I 62I. The I signal component input to the Nyquist filter for I 62I is filtered by a filter characteristic which constructs the Nyquist filter characteristic by the set of the transmission and receiver, and is input to the shift register for I 63I and the correlation computing unit for I 64I.

The I signal component input to the shift register for I 63I sequentially moves to the bit (the flip flop) of the output end from the bit (the flip flop) of the input end in correspondence to the clock timing of the action clock, and is input to the correlation computing unit for I 64I.

In the correlation computing unit for I 64I, the correlation value is calculated on the basis of the multiplication of the I signal component which is output from the Nyquist filter for I 62I and the I signal component before one symbol term which is output from the shift register for I 63I, in correspondence to the clock timing of the action clock, and is input to the adder 65.

Further, in the same manner, the receiver signal input to the multiplier 61Q for Q is multiplied by $-\cos \omega t$, the Q signal component is extracted, and is input to the Nyquist filter for Q 62Q. The Q signal component input to the Nyquist filter for Q is filtered by a filter characteristic which constructs the Nyquist filter characteristic by the set of the transmission and receiver, and is input to the shift register for Q 63Q and the correlation computing unit for Q 64Q.

The Q signal component input to the shift register for Q 63Q sequentially moves to the bit (the flip flop) of the output end from the bit (the flip flop) of the input end in correspondence to the clock timing of the action clock, and is input to the correlation computing unit for Q 64Q.

In the correlation computing unit for Q 64Q, the correlation value is calculated on the basis of the multiplication of the Q signal component which is output from the Nyquist filter for Q 62Q and the Q signal component before one symbol term which is output from the shift register for Q 63Q, in correspondence to the clock timing of the action clock, and is input to the adder 65.

In the adder 65, the correlation value c(i) is calculated on the basis of the addition of the correlation value which is output from the correlation computing unit for I 64I, and the correlation value which is output from the correlation computing unit for Q 64Q, and is input to each of the capture unit 7 and the decoding unit 9.

In this case, the receiver signal is set to S(i), a real part of the receiver signal S(i) is set to I(i), an imaginary part of the receiver signal S(i) is set to Q(i), and an imaginary number unit is set to j ($j^2=-1$). The receiver signal S(i) is expressed as S(i)=I(i)+jQ(i). The receiver signal S(i-T) before one symbol is expressed as S(i-T)=I(i-T)+jQ(i-T).

The time T indicates a length of one symbol term. In the present embodiment, since one symbol is sampled at n number of sampling points, T=n×sampling interval is obtained. Reference symbol i denotes a clock number of the action clock.

Defining as mentioned above, the correlation value c(i) is expressed by c(i)=(I(i)+jQ(i))·(I(i-T)-jQ(i-T))=[I(i) I(i-T)+Q(i) Q(i-T)]+j[Q(i) I(i-T)-I(i) Q(i-T)].

Accordingly, on the assumption of c(i)=A+jB, reference symbols A and B are expressed by A=I(i) I(i-T)+Q(i) Q(i-T), and B=Q(i) I(i-T)-I(i) Q(i-T).

In the present embodiment, since DBPSK is used, it is possible to carry out the decoding process by disregarding the imaginary part B and using only the real part A. In other words, it is possible to obtain c(i)=A.

Accordingly, I(i) I (i-T) which is calculated by the correlation computing unit for I 64I, and Q(i) Q (i-T) which is calculated by the correlation computing unit for Q 64Q are added by the adder 65, and the result of addition A is input to the decoding unit 9.

The correlation value c(i) is first of all input to the square computing unit 71. In the square computing unit 71, the square of the correlation value c(i) is computed. Further, a result of computation is input as the square correlation value (e(i)=$A^2$=((I(i) I(i-T))+(Q(i) Q(i-T)))$^2$ to the threshold value comparing unit 72. In the threshold value comparing unit 72, the square correlation value $A^2$ is compared with the first threshold value Th1 so as to be binarized, and is sequentially input to the capture shift register 73.

In other words, in the case where the square correlation value e(i) is smaller than the first threshold value Th1, "0" is input to the capture shift register 73, and in the case where the square correlation value e(i) is equal to or more than the first threshold value Th1, "1" is input to the capture shift register 73.

The binarized square correlation value which is input to the capture shift register 73 is moved sequentially from the bit (the flip flop) of the input end to the bit (the flip flop) of the output end in correspondence to the clock timing of the action clock.

Further, the candidate comparing unit 74 sets the n bit binarized square correlation value which is stored in the capture shift register 73 to the shape data for one symbol every clock timing of the action clock, and compares with each of a plurality of pattern candidates which are stored in the pattern candidate storage unit 76.

The candidate comparing unit 74 compares the n bit data which is stored in the capture shift register 73 with the corresponding bit to each of the patterns, and outputs the result of comparison to the capture determining unit 75. The capture determining unit 75 counts a frequency at which the result of comparison indicating the coincidence from the candidate comparing unit 74 is input, and determines that the synchronous timing is captured if the frequency comes, for example, to three times.

In this case, the capture determining unit 75 carries out a determination of second coincidence at each of timings including after (n-1) sampling, after n sampling and after (n+1) sampling, from the determining time of the first coincidence, if the result of comparison indicating the first coincidence is input from the candidate comparing unit 74. Further, if the result of comparison indicating the coincidence is input from the candidate comparing unit 74, at any of the timings including after (n-1) sampling, after n sampling and after (n+1) sampling, from the determining time of the first coincidence, the capture determining unit 75 determines the second coincidence.

In this case, the capture determining unit 75 may carry out the determination of the second coincidence after n sampling from the determination of the first coincidence. In this case, it is possible to more securely capture the synchronous pattern by carrying out the determination of the coincidence at each of the timings after (n-1) sampling and after (n+1) sampling which correspond to the vicinity of after n sampling, in addition to after n sampling.

Further, if the capture determining unit 75 determines the second coincidence, it carries out a determination of a third coincidence at each of timings including after (2n-2) sampling, after (2n-1) sampling, after 2n sampling, after (2n+1) sampling and after (2n+2) sampling from the determining time point of the first coincidence. Further, the capture determining unit 75 determines the third coincidence if a result of comparison which indicates the coincidence is input from the candidate comparing unit 74, at any timing of after (2n-2) sampling, after (2n-1) sampling, after 2n sampling, after (2n+1) sampling and after (2n+2) sampling from the determining time of the first coincidence.

In this case, the capture determining unit 75 may carry out the determination of the third coincidence after 2n sampling from the determining time point of the first coincidence, or may be structured such as to carry out the determination of the third coincidence at each of the timings including after (n-1) sampling, after n sampling and after (n+1) sampling from the determining time point of the second coincidence.

Further, if a determining frequency of the coincidence comes to three times, the capture determining unit 75 captures the synchronous timing of the receiver signal, and informs the tracking unit 8 and the decoding unit 9 of the capture of the synchronous timing.

If the capture of the synchronous timing is informed, the tracking unit 8 compares each of a bit value (a mean value) of the center bit position of the tracking shift register 81, a bit value (an early value) one sample point before the mean value, and a bit value (a late value) one sample point after the mean value, each time the synchronous timing comes.

Further, in the case where the MEAN counter becomes equal to or more than the second threshold value Th2, the interval adjusting unit 82 actuates the decoding unit 9 by using the n cycle as the time interval up to the next synchronous timing, in such a manner as to maintain the current synchronous timing.

Further, in the case where the EARLY counter becomes equal to or more than the second threshold value Th2, the interval adjusting unit 82 sets the (n+1) cycle as the time interval from the current synchronous timing up to the next synchronous timing in such a manner as to delay the synchronous timing, and outputs the early_out to the decoding unit 9 for informing of the fact that the synchronous timing is after (n+1) cycle.

Further, in the case where the LATE counter becomes equal to or more than the second threshold value Th2, the interval adjusting unit 82 sets the (n−1) cycle as the time interval from the current synchronous timing up to the next synchronous timing in such a manner as to quicken the synchronous timing, and outputs the late_out to the decoding unit 9 for informing of the fact that the synchronous timing is after (n−1) cycle.

The data decoding unit 92 codes by 0 or 1 in correspondence to the code converting format of DBPSK with respect to the bit value which is stored at the bit position in the center of the decoding shift register 91, each time the synchronous timing comes, and decodes the receiver signal.

In the case of employing a data decoding unit 92A shown in FIG. 5B in place of the data decoding unit 92, the date decoding unit 92A determines a summation of the bit values of seven bit positions centering on the center bit position of the decoding shift register 91 each time the synchronous timing comes, codes the summation by 0 or 1 in correspondence to the code converting format of DBPSK and decodes the receiver signal.

Further, if the data decoding unit 92 detects the bit pattern of the SFD unit 112, for example, "1010" from the decoded data, it assumes that the synchronous is established and starts the output of the decoded data to the data processing unit 11.

In accordance with the action as mentioned above, the communication apparatus M can delayed detects the communication signal if the communication signal is propagated in the transmission line PL, and can decodes the data from the receiver signal.

If the decoded data is input from the data decoding unit 92, the data processing unit 11 decodes the decoded data, and executes various processes in comply with a communication protocol of the MAC layer.

FIG. 6 are timing charts showing an action of the communication apparatus M at a time of detecting the no signal period. In FIG. 6, FIG. 6A shows an action clock, FIG. 6B shows with or without arrival of the receiver signal, FIGS. 6C to 6E show a state of an action of the decoding unit 9, and FIG. 6F shows a carrier loss signal which is output at a time when the no signal period detecting unit 10 detects the no signal period.

Figure 6A:
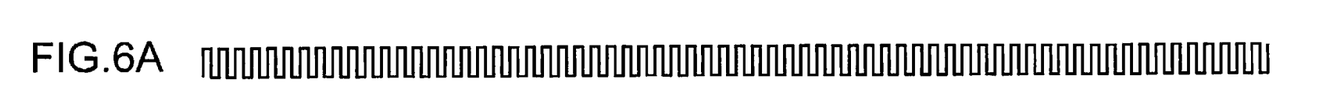
FIG. 6 are timing charts showing an action of the communication apparatus at a time of detecting a no signal period.
Figures 6B, 6C:
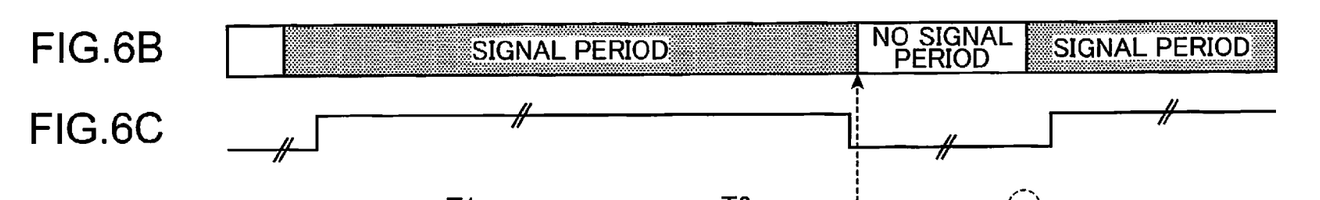

In this case, in FIG. 6B, a shade portion indicates that the receiver signal comes, and the other portion indicates the no signal zone that the receiver signal does not come. Further, in FIG. 6, FIG. 6C shows a state of the action of the decoding unit 9 at a time when the parity error is not generated, FIG. 6D shows a state of the action of the decoding unit 9 at a time when the parity error is generated in the communication apparatus in accordance with the comparative example which is not provided with the no signal period detecting unit 10, and FIG. 6E shows a state of the action of the decoding unit 9 at a time when the parity error is generated in the present communication apparatus M.

Figure 6D:
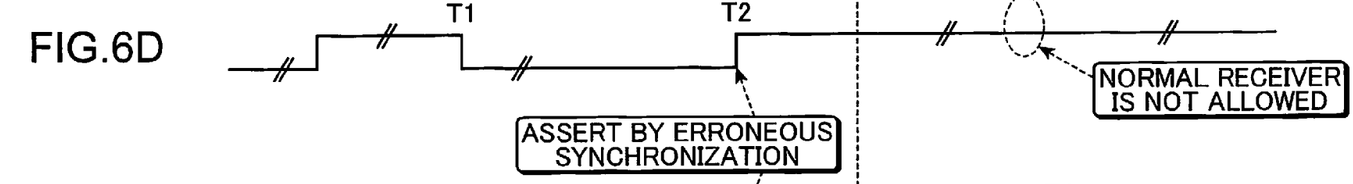
Figure 6E:
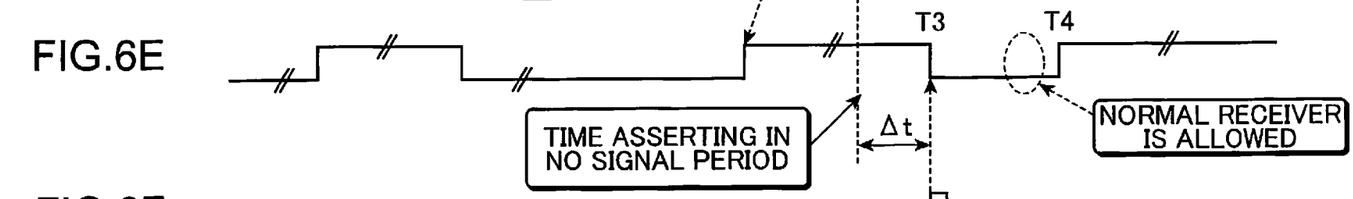
Figure 6F:
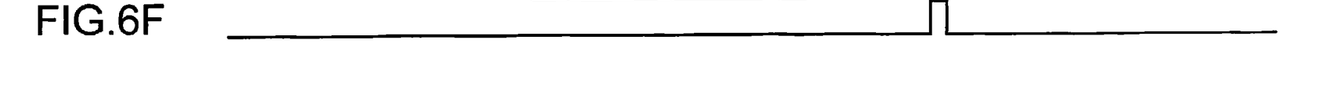

Further, in FIGS. 6C to 6E, a term of a high level indicates a term for which the decoding unit 9 carried out the decoding process, and a term of a low level indicates a term for which the decoding unit 9 does not carry out the decoding process.

In the case where the parity error is not generated, the decoding unit 9 starts the decoding process if the receiver signal comes, and the synchronous timing is captured by the capture unit 7, as shown in FIG. 6C. Further, if the receiver signal is finished, a stop of the decoding process is instructed from the data processing unit 11, and the decoding unit 9 finishes the decoding process. Further, if the next receiver signal comes, and the synchronous timing is captured by the capture unit 7, the decoding unit 9 again starts the decoding process.

On the other hand, if the parity error is generated, a generation of the parity error is reported to the decoding unit 9 from the data processing unit 11 at a time T1, as shown in FIG. 6D, and the decoding unit 9 stops the decoding process.

In this case, after the time T1, the capture unit 7 carries over the process of detecting the synchronous timing. Accordingly, in the case where absolutely the same data pattern as the preamble unit 101 in FIG. 3 is included in the receiver signal after the time T1, there is generated such a case that the capture unit 7 detects the synchronous timing in the payload unit 102 of the receiver signal (a time T2 in FIG. 6D). In accordance with this, the decoding unit 9 starts the decoding action at the time T2.

In the comparative example, since the no signal period detecting unit 10 does not exist, the decoding unit 9 carries over the decoding process even if the receiver signal is finished and the no signal period is generated, as shown in FIG. 6D. Accordingly, the decoding unit 9 cannot accurately decode the next receiver signal.

Accordingly, the present communication apparatus M is provided with the no signal period detecting unit 10. In accordance with this, even if the decoding process is started at the time T2 in FIG. 6E, the carrier loss signal is output from the no signal period detecting unit 10 in the case where the receiver signal is finished and the no signal period is generated.

Specifically, the no signal period detecting unit 10 informs the capture unit 7 and the decoding unit 9 of the carrier loss signal if the signal of the low level is output from the limiter amplifier 32 continuously for a predetermined time Δt or longer, and the generation of the no signal period is detected. In accordance with this, the decoding unit 9 stops the decoding process (a time T3).

Alternatively, the no signal period detecting unit 10 may observe a frequency of the receiver signal which is output from the limiter amplifier 32, and may detects the generation of the no signal period in the case of observing the receiver signal in which the frequency is deflected largely from the carrier frequency or the transmission zone continuously for the predetermined time Δt or longer.

Accordingly, the capture unit 7 can capture the synchronous timing by the preamble unit 101 of the next receiver signal (a time T4), and the decoding unit 9 can accurately decode the next receiver signal.

As mentioned above, in accordance with the communication apparatus M of the present embodiment, if the no signal period is detected after the capture of the synchronous timing, the capture of the synchronous timing is cancelled. In accordance with this, it is possible to prevent the decoding process from being continuously carried out in the no signal period.

Further, the delayed correlation computing unit 6 carries out the delayed correlation computation with respect to the receiver signal, and the capture unit 7 determines on the basis of the output of the delayed correlation computing unit 6 whether or not the receiver signal is the communication signal which is transmitted by the transmission apparatus, whereby the delayed detection is carried out. Further, the result (the correlation value c(i) (=A)) of the delayed correlation computation which is created in a step in process of the delayed detection process is output to the decoding unit 9.

In accordance with this, in comparison with the case of a typical receiver apparatus in which the receiver signal is divided into two parts, the delayed detection is carried out by one of them and the decoding is carried out another receiver signal, a part of the delayed detection unit is used for the decoding process in the present communication apparatus M. Accordingly, it is possible to reduce an electric power consumption at a lower cost.

Further, in the communication apparatus M in accordance with the present embodiment, a plurality of shape candidates (pattern candidates) for one symbol are previously prepared, and a plurality of pattern candidates are previously stored in the pattern candidate storage unit 76. In accordance with this, the receiver signal can be easily determined if it is the communication signal which is transmitted by the another communication apparatus, and the communication apparatus M can securely capture the arrival of the receiver signal.

On the other hand, in the case where the frequency that the shape data for one symbol in the capture shift register 73 coincides with any of a plurality of pattern candidates carries over plural times, the communication apparatus M in accordance with the present embodiment assumes the receiver signal as the communication signal which is transmitted by the another communication apparatus (the synchronous capture).

Accordingly, the communication apparatus M can carry out the determination that the receiver signal is the communication signal which is transmitted by the another communication apparatus, and it is possible to accurately carry out the delayed detection.

Further, in the communication apparatus M in accordance with the present embodiment, in at least one of a plurality of pattern candidates, at least one value in each of the bits is optional. In accordance with this, even in the case where the shape of the symbol becomes different from the transmission waveform by the another communication apparatus during the transmission, it is possible to determine that the receiver signal is the communication signal which is transmitted by the another communication apparatus. In accordance with this, the present communication apparatus M can more securely capture the synchronous timing.

Further, in the present communication apparatus M, since the tracking unit 8 is provided, it is possible to compensate a deflection between the clock interval of the another communication apparatus and the clock interval of the communication apparatus M, and it is possible to more securely carry out the delayed detection.

Further, in the present communication apparatus M, since the decoding unit 9 is provided, it is possible to carry out the decoding of the data on the basis of the receiver signal.

Further, in the typical conventional means, an auto gain control amplifier (an AGC amplifier) and an analogue-digital converter (an AD converter) have been used in a circuit before inputting the receiver signal. Accordingly, the receiver signal which is picked up from the transmission line PL is adjusted to an appropriate amplitude by the AGC amplifier, is converted into a digital signal from an analogue signal by the AD converter, and is input to the receiver circuit.

On the other hand, in the present communication apparatus M, the limiter amplifier 32 is used as mentioned above in the circuit before inputting the receiver circuit 42. In accordance with this, the receiver signal which is picked up from the transmission line PL is converted into a rectangular wave signal by the limiter amplifier 32, and is input to the receiver circuit 42. In accordance with this, in the present communication apparatus M, since the limiter amplifier 32 is used in place of the AGC amplifier and the AD converter which correspond to the typical conventional means, a circuit scale becomes smaller. As a result, the present communication apparatus M can further reduce the electric power consumption at a lower cost.

The description is given appropriately and sufficiently of the present invention through the embodiment with reference to the accompanying drawings as mentioned above for expressing the present invention, however, those skilled in the art should recognize that it is easily carried out to change and/or improve the embodiment mentioned above. Accordingly, it is understood that a changed aspect or an improved aspect executed by those skilled in the art is included in a scope of claims as long as the changed aspect or the improved aspect does not deflect from the scope of the claims.

The technical features of the receiver circuit mentioned above can be arranged as follows.

(1) The receiver circuit mentioned above is a receiver circuit receiving a receiver signal of a differential binary phase shift keying, comprising a delayed correlation computing unit which carries out a delayed correlation computation determining a correlation value correlated to a sampling value before one symbol period, with regard to each of sampling values of the receiver signal, a capture unit which captures a synchronous timing of the receiver signal, on the basis of the correlation value calculated by the delayed correlation computing unit, and a no signal period detecting unit which detects a no signal period which does not receive the receiver signal, wherein the capture unit cancels the capture of the synchronous timing in the case where the no signal period is detected by the no signal period detecting unit.

In accordance with this structure, if the no signal period is detected after the capture of the synchronous timing, the capture of the synchronous timing is cancelled. In accordance with this, it is possible to prevent the decoding process from being carried out continuously in the no signal period, and it is possible to accurately decode the next coming receiver signal.

(2) It is preferable that there are further provided with a decoding unit which decodes the receiver signal in use of the captured synchronous timing as a reference in the case where the synchronous timing of the receiver signal is captured by the capture unit, and a data processing unit which detects on the basis of a decoded data which is decoded by the decoding unit whether or not an error bit and an end timing of the receiver signal are included, and that the capture unit cancels the capture of the synchronous timing in the case where inclusion of the end timing and the error bit is detected by the data processing unit.

If the inclusion of the error bit in the receiver signal is detected by the data processing unit, the capture of the synchronous timing is cancelled in process of the receive of the receiver signal, and the synchronous timing is thereafter captured again in the receiver signal, the cancel of the capture of the synchronous timing on the basis of the end of the receiver signal is not indicated from the data processing unit.

However, since the capture of the synchronous timing is canceled if the no signal period is detected by the no signal period detecting unit, the next receiver signal is prevented from being decoded on the basis of the synchronous timing which is captured by the previous receiver signal, and it is possible to accurately decode the receiver signal.

(3) It is preferable that the decoding unit is provided with a decoding shift register which stores a correlation value for one symbol sequentially output from the delayed correlation computing unit, and a data decoding unit which decodes the data for one bit included in the receiver signal on the basis of the correlation value which is stored at a bit position in the center of the decoding shift register, at the synchronous timing.

In accordance with this structure, since the data for one bit of the receiver signal is decoded by using the correlation value which is stored at the bit position in the center of one symbol, it is possible to accurately decode the receiver signal.

(4) It is preferable that the decoding unit is provided with a decoding shift register which stores a correlation value for one symbol sequentially output from the delayed correlation computing unit, and a data decoding unit which decodes the data for one bit included in the receiver signal on the basis of a correlation value which is stored at a bit position in the center of the decoding shift register, a correlation value which is stored at one or a plurality of bit positions in an upstream side of the center bit position, and a correlation value which is stored at one or a plurality of bit positions in a downstream side of the center bit position, at the synchronous timing.

In accordance with this structure, since the data for one bit of the receiver signal is decoded by using a plurality of correlation values which are stored at the center bit position of one symbol, one or a plurality of bit positions in the upstream side of the center bit position, and one or a plurality of bit positions in the downstream side of the center bit position, it is possible to accurately decode the receiver signal.

(5) It is preferable that the receiver signal has a frame structure which is provided with a preamble unit and a payload unit, and the capture unit detects fulfillment of the preamble unit on the basis of a decoded data which is decoded by the decoding unit when capturing the synchronous timing.

In accordance with this structure, the end of the preamble unit is detected on the basis of the output of the decoding unit, and it is possible to establish the synchronization with the transmitted signal.

(6) It is preferable that the capture unit is provided with a pattern candidate storage unit which stores beforehand a plurality of candidates for a shape data of one symbol as pattern candidates, a shape creating unit which creates a shape data for one symbol on the basis of an output of the delayed correlation computing unit, and a candidate comparing unit which compares the shape data for one symbol of the shape creating unit, with each of the plurality of pattern candidates, and determines a capture of the synchronous timing, in the case where determination is made consecutively a plurality of times that the shape date for one symbol of the shape creating unit coincides with at least one of a plurality of pattern candidates in the candidate comparing unit.

In accordance with this structure, a plurality of candidates of the shape data for one symbol are previously prepared. In accordance with this, it is possible to prevent the synchronous timing from not being captured, by some noise included in the receiver signal. On the other hand, since the synchronous timing is captured in the case where the coincidence of the shape data for one symbol with a plurality of pattern candidates carries over at a plurality of times, it is possible to enhance a capturing precision of the synchronous timing.

(7) It is preferable that the delayed correlation computing unit divides the receiver signal into an I signal component and a Q signal component, and calculates a sum of the correlation values of the respective components, the shape creating unit is provided with a square computing unit which squares the sum of the correlation values output from the delayed correlation computing unit so as to calculate a square correlation value, a threshold value comparing unit which binarizes the square correlation value by comparing the square correlation value with a predetermined threshold value, and a capture shift register which stores an output of the threshold value comparing unit for one symbol, and the candidate comparing unit compares the data which is stored in the capture shift register with a plurality of pattern candidates.

In accordance with this structure, since the sum of the correlation values of the I signal component and the Q signal component is squared, the square correlation value is calculated, and the square correlation value is binarized, and is sequentially input to the shift register having the storage capacity for one symbol, the shape data for one symbol is created. Further, the shape data for one symbol which is input to the shift register is compared with a plurality of pattern candidates, and the capture of the synchronous timing is determined.

(8) It is preferable that the shape data for one symbol is expressed by a plurality of bits, the pattern candidate is a predetermined bit pattern which is formed by prescribing each of the bits beforehand, the plurality of pattern candidates are different bit patterns from each other, and at least one value of each of the bits is optional, in at least one of the plurality of pattern candidates.

In accordance with this structure, at least one value of each of the bits is made optional, in at least one of a plurality of pattern candidates. Accordingly, even in the case of receiving the receiver signal having some noise, it is possible to capture the synchronous timing of the receiver signal.

(9) It is preferable that there is further provided with a tracking unit which specifies the square correlation value corresponding to the current synchronous timing as a center square correlation value for one symbol, and adjusts a time interval from the current synchronous timing up to an arrival of the next synchronous timing, on the basis of the specified center square correlation value and square correlation values which are time-wise in the vicinity of the center square correlation value.

In accordance with this structure, the time interval from the current synchronous timing up to the arrival of the next synchronous timing is adjusted by using the center square correlation value for one symbol, and the square correlation values which are time-wise in the vicinity of the square correlation value. Accordingly, in the case where the synchronous timing is deflected from the center position of one symbol, it is possible to turn back the deflected synchronous timing to the center position of one symbol.

(10) It is preferable that the tracking unit is provided with a tracking shift register which stores a square correlation value for one symbol which is sequentially output from the square computing unit, and an interval adjusting unit which specifies a bit position storing a maximum square correlation value by comparing a square correlation value which is stored at a position in the center of the tracking shift register, a square correlation value which is stored at a bit position before the center bit position, and a square correlation value which is stored at a bit position after the center bit position, each time the synchronous timing comes, applies a predetermined point to the specified bit position, specifies a bit position at which an accumulated value of the applied points becomes maximum, and adjusts a time interval from the current synchronous timing up to an arrival of the next synchronous timing, on the basis of the specified bit position.

In accordance with this structure, even in the case where the synchronous timing is deflected from the center position for one symbol, it is possible to precisely turn back the deflected synchronous timing to the center position for one symbol.

(11) It is preferable that the receiver apparatus mentioned above is provided with a coupling unit which picks up the receiver signal from a transmission line, a receiver unit which decodes the receiver signal on the basis of the receiver signal picked up by the coupling unit, and an incoming unit which creates a drive power driving the receiver unit from an electric power flowing in the transmission line, and the receiver unit is provided with the receiver circuit in any one of (1) to (10).

In accordance with this structure, it is possible to provide the receiver apparatus which has a low cost and has a low electric power consumption.

The invention claimed is:

1. A receiver circuit receiving a receiver signal of a differential binary phase shift keying, the receiver circuit comprising:
   a delayed correlation computing unit which carries out a delayed correlation computation that determines a correlation value correlated to a sampling value before one symbol period, with regard to each of sampling values of the receiver signal;
   a capture unit which captures a synchronous timing of the receiver signal, on the basis of the correlation value calculated by the delayed correlation computing unit;
   a decoding unit which decodes the receiver signal in use of the captured synchronous timing as a reference in a case where the synchronous timing of the receiver signal is captured by the capture unit; and
   a no signal period detecting unit which detects a no signal period which does not receive the receiver signal, wherein the capture unit cancels the capture of the synchronous timing in a case where the no signal period is detected by the no signal period detecting unit; and
   a data processing unit which detects on the basis of a decoded data which is decoded by the decoding unit whether or not an error bit and an end timing of the receiver signal are included,
   wherein the capture unit cancels the capture of the synchronous timing in the case where inclusion of the end timing and the error bit is detected by the data processing unit.

2. The receiver circuit according to claim 1, wherein the decoding unit comprises:
   a decoding shift register which stores the correlation value for one symbol sequentially output from the delayed correlation computing unit; and
   a data decoding unit which decodes the data for one bit included in the receiver signal on the basis of the correlation value which is stored at a bit position in the center of the decoding shift register, at the synchronous timing.

3. The receiver circuit according to claim 1, wherein the decoding unit comprises:
   a decoding shift register which stores the correlation value for one symbol sequentially output from the delayed correlation computing unit; and
   a data decoding unit which decodes the data for one bit included in the receiver signal on the basis of a first correlation value which is stored at a bit position in the center of the decoding shift register, a second correlation value which is stored at one or a plurality of bit positions in an upstream side of the center bit position, and a third correlation value which is stored at one or a plurality of bit positions in a downstream side of the center bit position, at the synchronous timing.

4. The receiver circuit according to claim 1, wherein the receiver signal has a frame structure which is provided with a preamble unit and a payload unit, and wherein the capture unit detects a fulfillment of the preamble unit on the basis of the decoded data which is decoded by the decoding unit when capturing the synchronous timing.

5. The receiver circuit according to claim 1, wherein the capture unit comprises:
   a pattern candidate storage unit which stores beforehand a plurality of candidates for a shape data of one symbol as pattern candidates;
   a shape creating unit which creates the shape data for one symbol on the basis of an output of the delayed correlation computing unit;
   a candidate comparing unit which compares the shape data for one symbol of the shape creating unit, with each of the plurality of pattern candidates; and
   a capture determining unit which determines a capture of the synchronous timing, in a case where a determination that the shape data for one symbol of the shape creating unit coincides with at least one of the plurality of pattern candidates in the candidate comparing unit carries over at a plurality of times.

6. The receiver circuit according to claim 5, wherein the delayed correlation computing unit divides the receiver signal into an I signal component and a Q signal component, and calculates a sum of the correlation values of the respective components,
   the shape creating unit comprises:
   a square computing unit which squares the sum of the correlation values output from the delayed correlation computing unit so as to calculate a square correlation value;
   a threshold value comparing unit which binarizes the square correlation value by comparing the square correlation value with a predetermined threshold value; and
   a capture shift register which stores an output of the threshold value comparing unit for one symbol, and wherein the candidate comparing unit compares the output of the threshold value comparing unit for one symbol which is stored in the capture shift register with the plurality of pattern candidates.

7. The receiver circuit according to claim 5, wherein the shape data for one symbol is expressed by a plurality of bits,
   the pattern candidate is a predetermined bit pattern which is formed by prescribing each of the bits beforehand, and the plurality of pattern candidates are different bit patterns from each other, and at least one value of each of the bits is optional, in at least one of the plurality of pattern candidates.

8. The receiver circuit according to claim 6, further comprising a tracking unit which specifies the square correlation value corresponding to a current synchronous timing as a center square correlation value for one symbol, and adjusts a time interval from the current synchronous timing up to an arrival of a next synchronous timing, on the basis of the specified center square correlation value and square correlation values which are time-wise in a vicinity of the center square correlation value.

9. The receiver circuit according to claim 8, wherein the tracking unit comprises:
   a tracking shift register which stores the square correlation value for one symbol which is sequentially output from the square computing unit; and
   an interval adjusting unit which specifies a bit position storing a maximum square correlation value by comparing a first square correlation value which is stored at a position in the center of the tracking shift register, a second square correlation value which is stored at a bit position in an upstream side of the center bit position, and a third square correlation value which is stored at a bit position in a downstream side of the center bit position, each time the synchronous timing comes, applies a predetermined point to the specified bit position, specifies a bit position at which an accumulated value of the applied points becomes maximum, and adjusts a time interval from the current synchronous timing up to an arrival of the next synchronous timing, on the basis of the specified bit position.

10. A receiver apparatus comprising:

a coupling unit which picks up a receiver signal from a transmission line;

a receiver unit which decodes the receiver signal on the basis of the receiver signal picked up by the coupling unit; and an incoming unit which creates a drive power driving the receiver unit from an electric power flowing in the transmission line, wherein the receiver unit is provided with a receiver circuit, the receiver circuit receiving the receiver signal of a differential binary phase shift keying, the receiver circuit comprising:

a delayed correlation computing unit which carries out a delayed correlation computation that determines a correlation value correlated to a sampling value before one symbol period, with regard to each of sampling values of the receiver signal;

a capture unit which captures a synchronous timing of the receiver signal, on the basis of the correlation value calculated by the delayed correlation computing unit;

a decoding unit which decodes the receiver signal in use of the captured synchronous timing as a reference in a case where the synchronous timing of the receiver signal is captured by the capture unit; and a no signal period detecting unit which detects a no signal period which does not receive the receiver signal, wherein the capture unit cancels the capture of the synchronous timing in a case where the no signal period is detected by the no signal period detecting unit; and a data processing unit which detects on the basis of a decoded data which is decoded by the decoding unit whether or not an error bit and an end timing of the receiver signal are included, wherein the capture unit cancels the capture of the synchronous timing in the case where inclusion of the end timing and the error bit is detected by the data processing unit.

* * * * *